United States Patent [19]
Reinke

[11] Patent Number: 5,862,997
[45] Date of Patent: Jan. 26, 1999

[54] CENTER PIVOT IRRIGATION SYSTEM WITH IMPROVED WORM GEAR WHEEL DRIVE

[76] Inventor: Richard F. Reinke, P.O. Box 666, Deshler, Nebr. 68340

[21] Appl. No.: 23,535

[22] Filed: Feb. 13, 1998

[51] Int. Cl.$^6$ .................................................. A01G 25/09
[52] U.S. Cl. .......................................... 239/728; 180/343
[58] Field of Search .................................... 239/732, 730, 239/728, 726, 723, 722; 134/899; 74/116; 180/343, 371

[56] References Cited

U.S. PATENT DOCUMENTS 3,662,776   5/1972   Bryant et al. ............................ 239/728

Primary Examiner—Lesley D. Morris
Attorney, Agent, or Firm—Jeffrey L. Thompson; Thompson & Thompson, PA

[57] ABSTRACT

A center pivot irrigation system having an improved worm gear wheel drive assembly for driving the wheels of support towers for moving a water distribution pipe around a central pivot axis. The improved worm gear wheel drive assembly includes a worm pinion connected to a shaft driven by a drive motor, a spur gear reduction assembly, and a wheel gear connected to one of the wheels of the support tower. The spur gear reduction assembly has an input side spur gear intermeshed with the worm pinion, and an output side spur gear intermeshed with the wheel gear. The improved worm gear wheel drive assembly enables the worm pinion to operate at a higher rotational speed and lower torque, thereby increasing the mechanical efficiency of the drive assembly as compared to conventional drive arrangements for center pivot irrigation systems.

16 Claims, 6 Drawing Sheets

CENTER PIVOT IRRIGATION SYSTEM WITH IMPROVED WORM GEAR WHEEL DRIVE

BACKGROUND OF THE INVENTION

1. Field of the Invention

The present invention relates generally to center pivot irrigation systems that employ a plurality of wheeled support towers secured to and spaced along the length of a water distribution pipe. In particular, the present invention relates to a center pivot irrigation system having an improved worm gear wheel drive assembly for driving the wheels of the support towers for moving the water distribution pipe around a central pivot axis of the irrigation system.

2. Description of the Related Art

Pivot irrigation systems are widely used throughout the world to provide water for agricultural purposes in arid regions. Typically, such systems include a plurality of spaced support towers connected by truss sections that support an elevated water distribution pipe between the towers. The water distribution pipe extends radially from a central pivot communicating with a pressurized water supply. Water passing through the distribution pipe is forced out through a number of sprinkler heads, spray guns, drop nozzles, and the like, spaced along the length of the pipe. Each tower in the system is supported on wheels that are power rotated at slow speeds to move the tower in a circular path about the central pivot to thereby irrigate a generally circular tract of land.

A number of drive assemblies have been developed for driving the support wheels of pivot irrigation systems. The most widely used drive assembly in the industry today is a worm gear drive developed by the present applicant, which is described in the Applicant's prior U.S. Pat. No. 3,623,662. The conventional worm gear drive consists of a drive motor and center gearbox having front and rear output shafts with a worm pinion mounted on the front and rear ends of the output shafts. A worm wheel is carried by the hub of each support wheel and is placed in meshing engagement with a respective worm pinion mounted on the output shafts. The worm wheel is thus driven by the worm pinion upon rotation of the output shaft, thereby causing the support wheel to rotate and move the respective tower of the irrigation system. The conventional worm gear drive provides a 50:1 gear reduction ratio between the output shaft of the drive motor and center gearbox and the hub of the support wheel.

The conventional worm gear drive assembly disclosed in the Applicant's U.S. Pat. No. 3,623,662, provided a simple, dependable, and relatively inexpensive construction. Moreover, the conventional worm gear drive assembly provided a significant advantage over earlier drive arrangements in that the meshing of the worm pinion with the worm wheel prevented the driven support wheels from rolling freely forward or backward as the irrigation system traverses uneven terrain. These advantages were quickly recognized throughout the industry and have made the conventional worm gear drive disclosed in the Applicant's U.S. Pat. No. 3,623,662 the standard and preferred drive assembly for center pivot irrigation systems for more than two decades.

However, the conventional worm gear drive assembly is quite inefficient in transferring power from the drive motor to the driven wheels. For example, the conventional worm gear arrangement operating at slow speeds has an approximate overall efficiency of only 40% due to the friction loss between the worm gear and the worm pinion. The efficiency of the worm gear drive assembly is particularly low in irrigation systems that require intermittent operation of the drive wheels due to the higher static coefficient of friction between the worm gear and the worm pinion. This inefficiency in the drive assembly has resulted in an increased horsepower and energy consumption required to obtain the desired torque and speed for moving the support towers of the pivot irrigation system.

A variety of other gear drive arrangements have been developed for center pivot irrigation systems. However, due to various problems with the construction and operation of these other systems, they have met with little acceptance in the industry.

For example, U.S. Pat. No. 4,093,036, issued to Knutson, discloses a tower drive assembly that uses three high ratio gear sets between a drive motor and each support wheel. The high ratio gear sets each include a first gear mounted on a support shaft and having a plurality of generally parallel rollers supported from and spaced equally about and radially outwardly from the support shaft. The gear sets each include a second gear mounted on a support shaft and having a plurality of outwardly opening notches formed in and spaced about an outer peripheral portion. The rollers of the first gear are meshed with the notches of the second gear of each set.

The successive high ratio gear reductions of the tower drive assembly of U.S. Pat. No. 4,093,036 permit the drive motor to operate at relatively low torques, thereby lessening the tendency of surges in the driving torque applied to the drive wheels. However, this tower drive assembly is complex and expensive to manufacture due to the roller assemblies required for each gear set. Moreover, unlike the worm gear drive arrangement of the Applicant's U.S. Pat. No. 3,623,662, the tower drive assembly of U.S. Pat. No. 4,093,036 would not effectively prevent free rolling of the drive wheels when the support towers traverse uneven terrain. A drive motor with a braking arrangement would normally be required for this purpose. However, such motor braking arrangements have been found unsuitable for the rugged operating conditions encountered by the intermittent operation of center pivot irrigation systems in uneven terrain.

SUMMARY OF THE INVENTION

It is an object of the present invention to provide a center pivot irrigation system having an improved worm gear wheel drive assembly that solves the problems associated with the conventional wheel drive assemblies described above.

More specifically, it is an object of the present invention to provide a center pivot irrigation system having an improved worm gear wheel drive assembly that requires less horsepower and energy consumption to obtain a desired torque and speed for driving the wheels of the support towers of the irrigation system.

It is a further object of the present invention to provide an improved worm gear wheel drive assembly for a center pivot irrigation system that is compact in construction so as to have greater ground clearance and a reduced width as compared to conventional worm gear wheel drive assemblies.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

According to the present invention, in order to solve the problems described above, a center pivot irrigation system having an improved wheel drive arrangement is provided. The irrigation system comprises: an elongated pipe having a first end connected to a water supply, the pipe having a plurality of water discharge openings spaced along a length thereof for discharging water over an area to be irrigated; at least one support tower for supporting the pipe above the area to be irrigated, the support tower being supported by a plurality of wheels for movement in a direction transverse to a longitudinal direction of the pipe; and a drive motor and an improved wheel drive arrangement connected between the drive motor and each wheel of the support tower. The improved wheel drive arrangement comprises a worm pinion connected to a shaft driven by the drive motor, the worm pinion being intermeshed with a first gear of a reduction gear assembly, the reduction gear assembly having a second gear intermeshed with a wheel gear that is connected to the wheel of the support tower for rotation therewith, whereby rotation of the wheel gear by the reduction gear assembly drivingly rotates the wheel. The first gear of the reduction gear assembly is larger in diameter than the second gear of the reduction gear assembly. The first and second gears of the reduction gear assembly are preferably spur gears.

The worm pinion operates together with the first gear of the reduction gear assembly to provide a gear reduction ratio greater than 35:1, and preferably between 40:1 and 60:1, so as to prevent coasting of the wheels when traversing uneven terrain. The reduction gear assembly operates together with the wheel gear to provide a further gear reduction ratio of approximately 6:1 to 10:1, and preferably about 9:1. The improved wheel drive of the present invention reduces the horsepower and energy requirements for driving a center pivot irrigation system, while preventing coasting of the drive wheels on uneven terrain.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A center pivot irrigation system having an improved worm gear wheel drive assembly according to a first embodiment of the present invention will now be described with reference to FIGS. 1 to 5 of the accompanying drawings.

Figure 1:
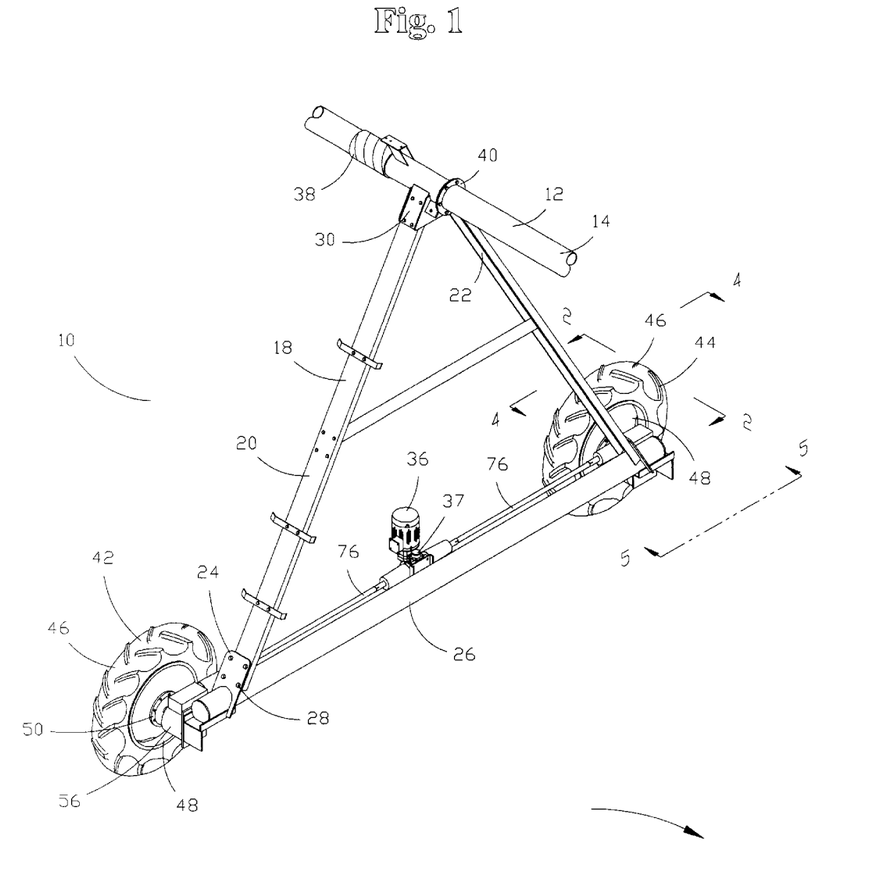
FIG. 1 is a perspective view of one of the support tower assemblies for supporting an irrigation pipe of a center pivot irrigation system according to the present invention.
Figure 1A:
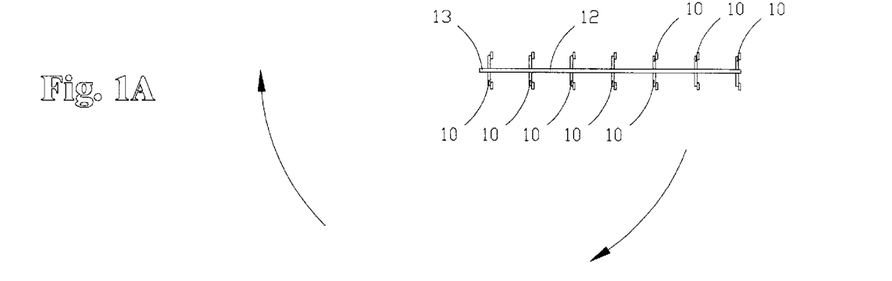
FIG. 1A is a plan view of a center pivot irrigation system according to the present invention.

The support tower assembly for the center pivot irrigation system is generally designated by the numeral 10, and the irrigation pipe or boom is generally designated by the numeral 12 and sweeps in a circular pattern about a center pivot structure 13 located at one end thereof, as shown in FIG. 1A. The irrigation boom or pipe is in the form of an elongated tubular pipe 14 having a plurality of discharge openings spaced along a length thereof, and a plurality of bracing and supporting truss assemblies generally designated by the numeral 18. The support tower assembly 10 includes a generally A-shaped construction formed by a pair of downwardly diverging frame members 20 and 22, which extend both forwardly and rearwardly from the pipe 14, as shown in FIG. 1. The lower ends of the members 20 and 22 are each connected to a rigid plate 24, which in turn is rigidly fixed to a horizontally disposed tubular frame member 26, as by welding or the like. The plate 24 is disposed at the same angle as the members 20 and 22 and secured rigidly thereto by bolt-type fasteners 28 or the like. The upper ends of the members 20 and 22 are secured to the pipe 14 by suitable bracket structures generally designated by the numeral 30. The support members 22 have a control system (not shown) having a conductor (not shown) extending therefrom for operating an electric drive motor 36. The drive motor 36 has a gearbox associated therewith for providing a suitable gear reduction and for outputting rotational energy to front and rear drive shafts 76.

A flexible coupling 38 is provided in the pipe 14 adjacent to each support assembly 10 to permit the pipe 14 to flex as the irrigation system traverses uneven terrain. The flexible coupling 38 also functions to reduce stress in the pipe 14 in the event that one or more of the support assemblies 10 become misaligned with the other support assemblies along the length of the irrigation system. A flanged coupling 40 is provided adjacent each support assembly 10 to facilitate assembly and disassembly of the irrigation system. The flanged coupling 40 is provided with an O-ring seal that fits in a groove on both flanges of the flanged coupling 40. A control system (not shown) is provided for controlling the operation of the electric motor 36 in response to deflection of adjacent pipe sections 14 about an axis defined by a specific construction of the flexible coupling 38.

Figure 2:
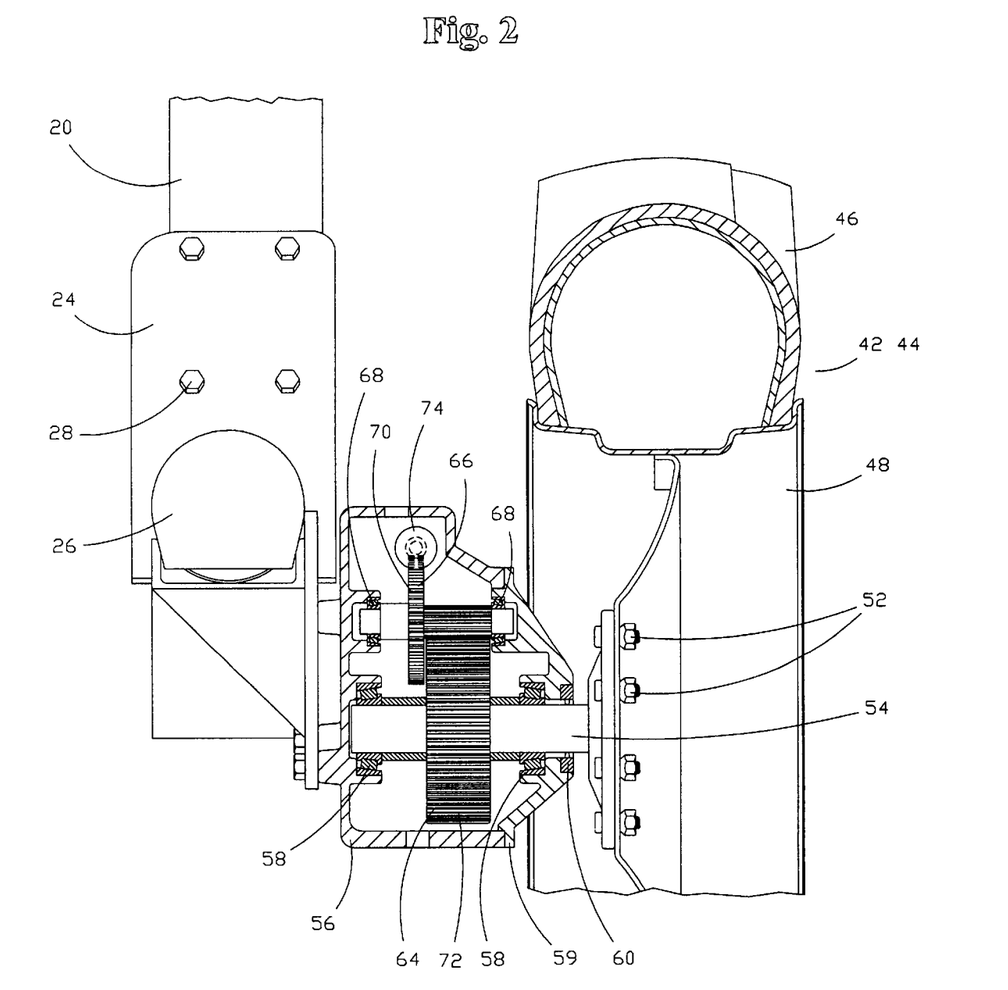
FIG. 2 is a detailed sectional view, on an enlarged scale, as viewed substantially in the direction of the section line 2—2 of FIG. 1, illustrating the structure of a drive wheel and improved worm gear drive associated therewith.

The improvement provided by the present invention is directed toward the drive connection between the output of the gearbox 37 associated with the electric drive motor 36 and a pair of supporting wheel assemblies 42 and 44, which are located at the opposite ends of the support frame member 26. Each wheel assembly 42 and 44 includes a pneumatically inflated tire 46 supported on a conventional wheel rim 48 secured in place on a hub 50 by lug bolts 52 to enable conventional vehicular wheels to be employed.

The hub 50 has a shaft 54 extending therefrom which is supported within an annular housing 56 by first and second bearing assemblies 58, such as tapered roller bearings, plain bronze bearings, or the like. The housing 56 includes a removable side plate 59 secured in place by suitable fastening bolts. A seal 60 is provided between the shaft 54 and the housing 56 to keep lubricating fluid within the housing 56 and to prevent dust and debris from entering the housing 56. The shaft 54 is retained in position by the bearing assemblies 58, which are assembled within the housing 56 when the side plate 59 is attached. The housing 56 is secured to the frame member 26 of the support assembly 10 by suitable fastening bolts or the like to enable torque to be transmitted through the housing 56 to the wheels 42, 44.

A wheel gear 64 is secured to the shaft 54 between the first and second bearing assemblies 58. The wheel gear 64 is preferably a spur gear that is keyed to the shaft 54 for rotation with the wheels 42, 44.

Figure 3:
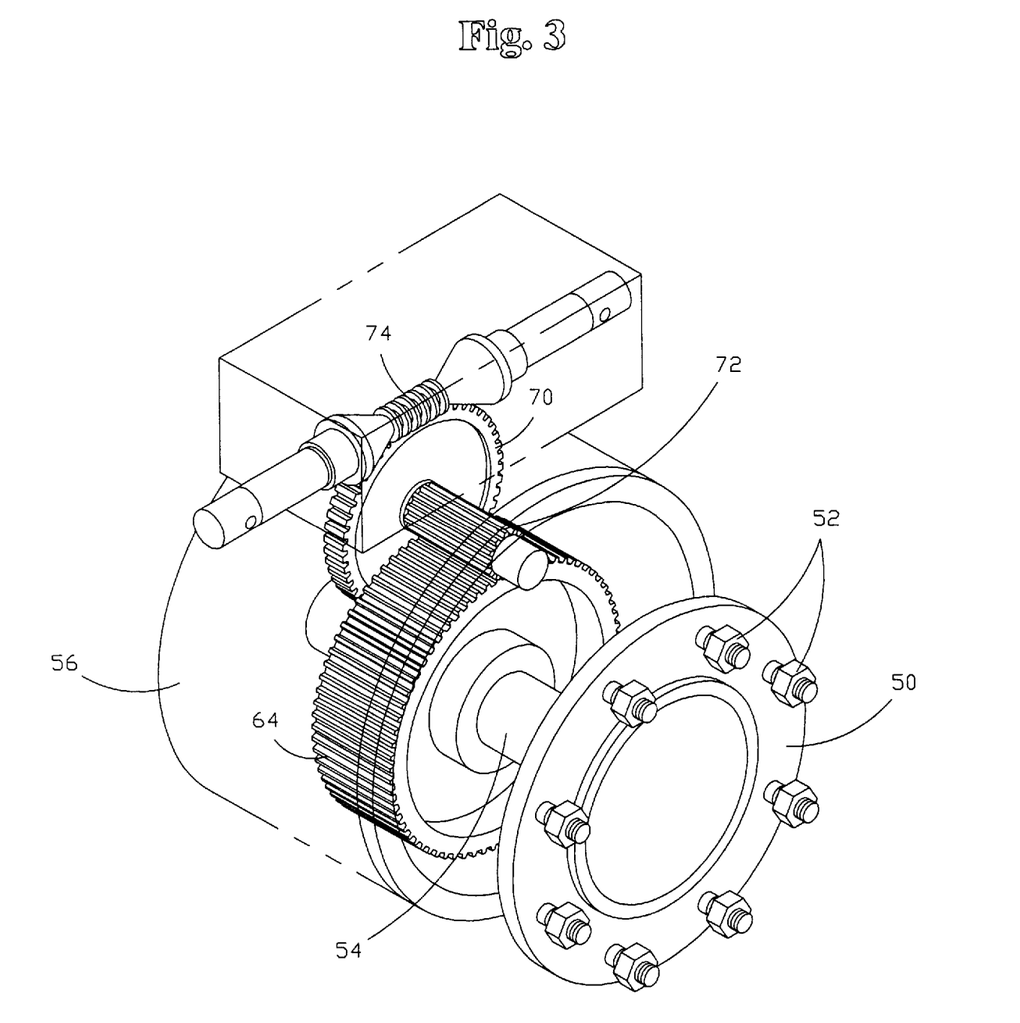
FIG. 3 is a cut-away perspective view of the improved worm gear drive assembly according to the present invention.
Figure 4:
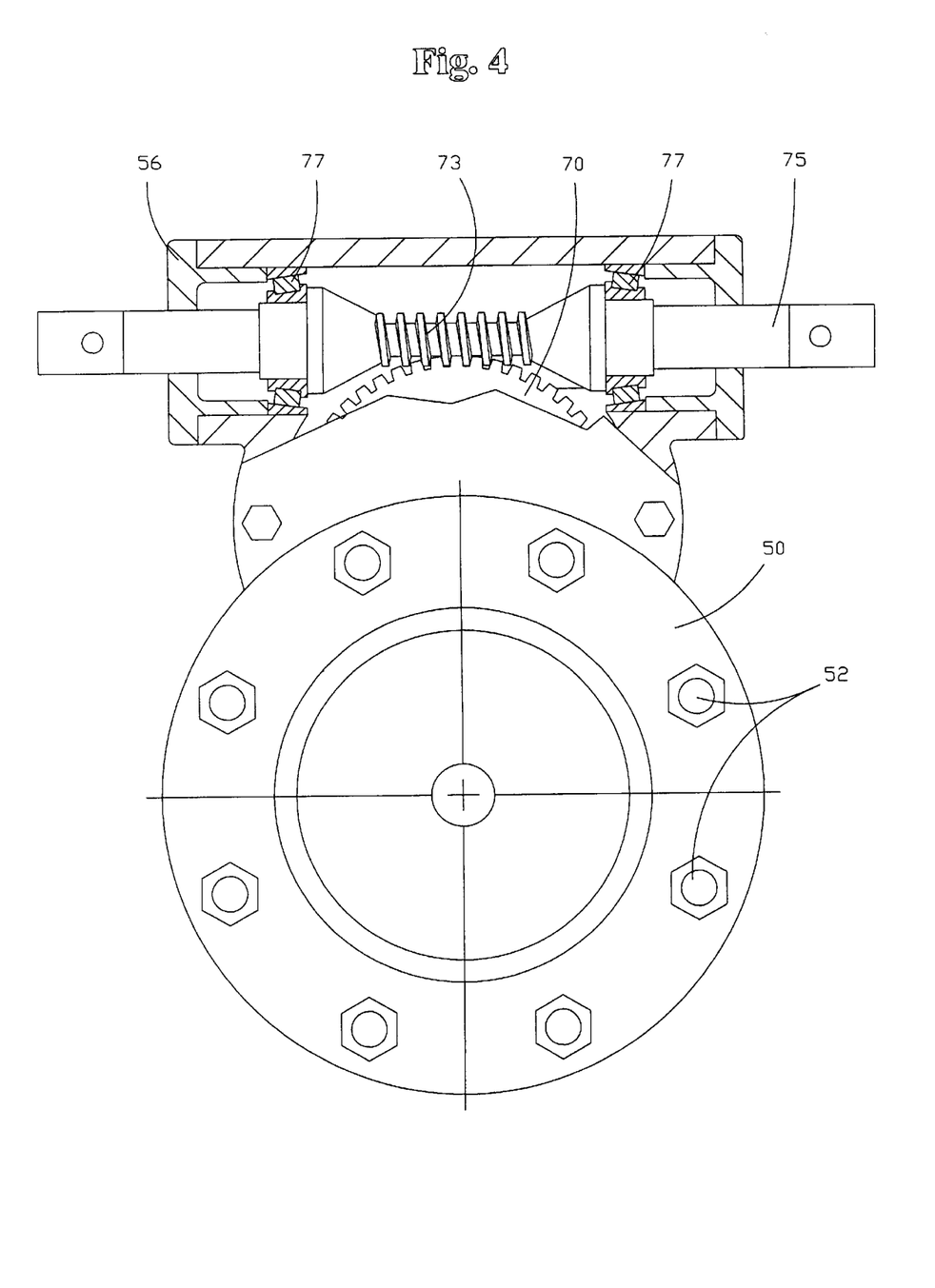
FIG. 4 is a front view, in partial section, of the worm gear drive assembly according to the present invention, as viewed substantially in the direction of the section line 4—4 of FIG. 1.
Figure 5:
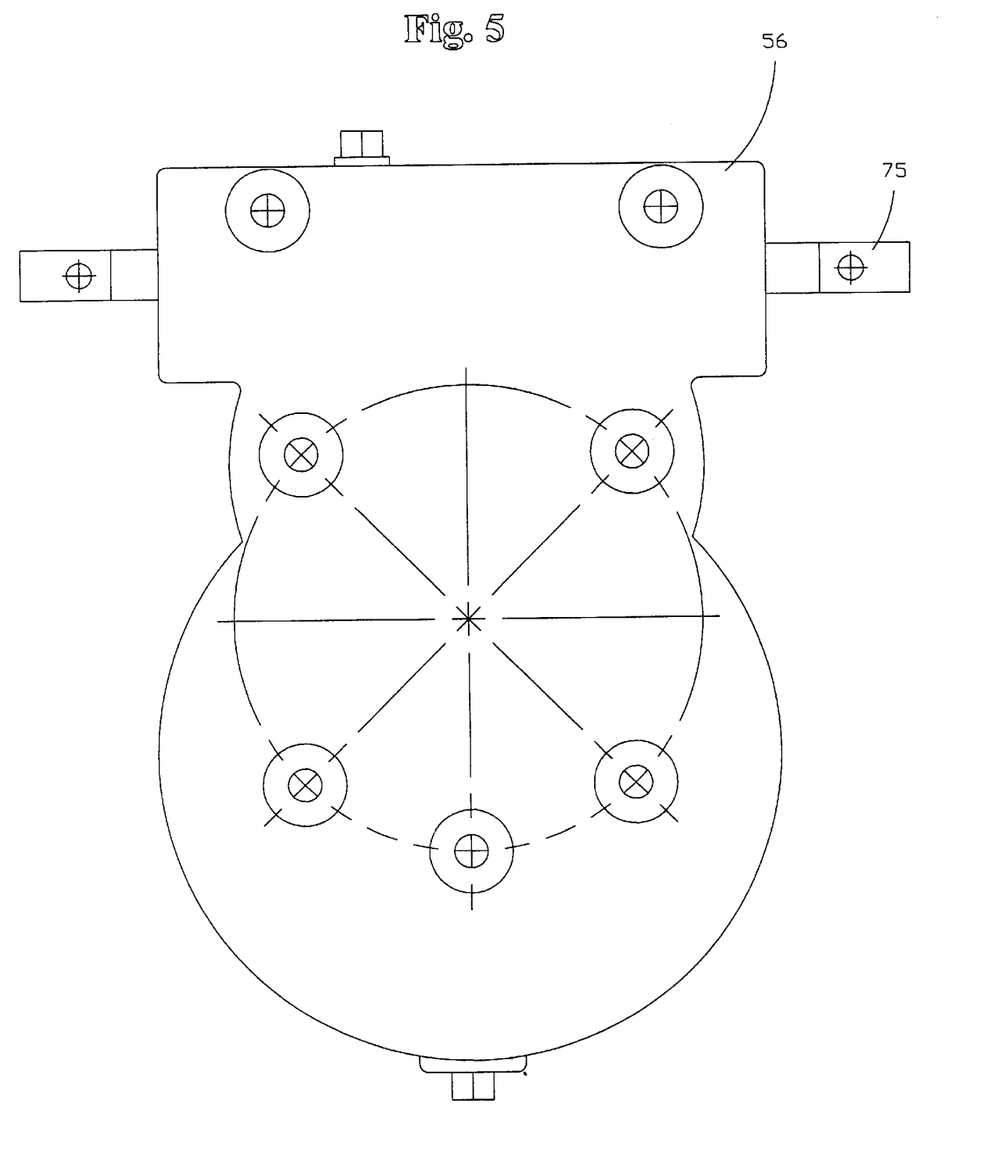
FIG. 5 is a rear side view of the worm gear drive assembly according the present invention, as viewed substantially in the direction of the section line 5—5 of FIG. 1.

A reduction gear assembly 66 is mounted for rotation within the housing 56 adjacent to the wheel gear 64. The reduction gear assembly 66 is supported at each end by a suitable bearing 68, such as a tapered roller bearing, plain bronze bearing, or the like. The reduction gear assembly 66 has a first gear 70 having a relatively large diameter, and a second gear 72 having a relatively small diameter. The second gear 72 is intermeshed with the gear teeth on the wheel gear 64 so as to rotate therewith. The first and second gears 70, 72 are preferably spur gears and provide a gear reduction ratio with the wheel gear 64 of approximately 6:1 to 10:1, and preferably 9:1.

A worm pinion 74 is secured to a shaft 75 within the housing 56. The shaft 75 is coupled to an end of a drive shaft 76 extending from the gearbox 37 associated with the electric drive motor 36. The shaft 75 is supported within the housing by suitable bearing assemblies 77, such as tapered roller bearings, plain bronze bearings, or the like. The worm pinion 74 is intermeshed with the gear teeth on the first gear 70 of the reduction gear assembly 66 so as to rotatingly drive the first gear 70 upon rotation of the worm pinion 74. The gear reduction ratio between the worm pinion 74 and the first gear 70 of the spur gear reduction assembly 66 is large enough that the worm pinion 74 will prevent coasting of the wheels 42, 44 when the irrigation system traverses uneven terrain. For example, the gear reduction ratio between the worm pinion 74 and the first gear 70 of the reducing gear assembly 66 is at least 35:1, and preferably within the range of 40:1 to 60:1. In a preferred embodiment, a gear reduction ratio of 50:1 is provided between the worm pinion 74 and the first gear 70.

The following Table 1 provides a comparison of the maximum input torque, power, speed, and efficiency of a conventional wheel drive assembly with the wheel drive assembly of the present invention. The comparison is made assuming the maximum output torque, power, and speed of the wheel drive assemblies is the same. Specifically, a maximum output torque of 11,700 lbf-in., an output power of 0.149 HP, and an output speed of 0.8 rpm are assumed for comparison of the respective inputs.

TABLE 1

INPUT PARAMETERS AND EFFICIENCIES OF WHEEL DRIVE ASSEMBLIES

|  | Input Torque | Input Speed | Input Power | Efficiency (approx.) |
| --- | --- | --- | --- | --- |
| Conventional Unit | 585 lbf-in. | 40 rpm | .371 HP | 40% |
| Improved Unit | 36.2 lbf-in. | 360 rpm | .207 HP | 72% |

As seen in the above Table 1, the worm pinion 74 in the present invention is driven, for example, at a rotational speed of approximately 360 revolutions per minute (rpm) and an input torque of approximately 36 lbf-in. to drive the support wheels 42, 44 of the irrigation system. In contrast, the worm pinion of a conventional wheel drive arrangement is typically driven at a rotational speed of approximately 40 rpm and an input torque of approximately 585 lbf-in. The higher rotational speed and lower torque of the worm pinion in the present invention, in conjunction with the different gear ratios provided by the spur gear reduction assembly 66, result in a dramatic improvement in the mechanical efficiency of the present drive assembly. For example, the Applicant has calculated the efficiency of the final gear drive assembly according to the present invention to be approximately 72%, as compared with an efficiency of approximately 40% for the conventional drive assembly. Thus, it can be seen that the present invention provides a significant improvement in mechanical efficiency that results in less horsepower and energy consumption requirements to obtain a desired torque and speed for driving the wheels of the irrigation system.

Figure 6:
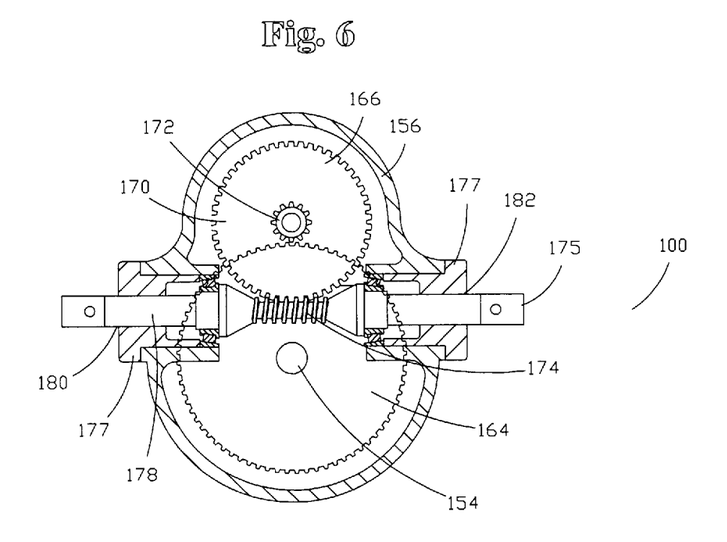
FIG. 6 is a sectional front view of an improved worm gear wheel drive arrangement according to a second embodiment of the present invention.
Figure 7:
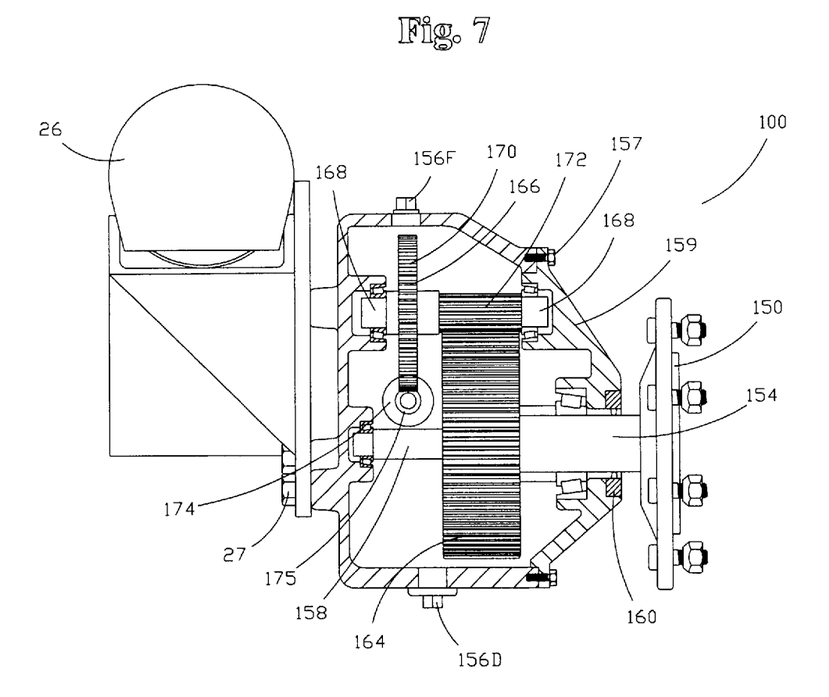
FIG. 7 is a sectional side view of the drive arrangement shown in FIG. 6.

A worm gear wheel drive assembly 100 according to a second embodiment of the present invention will now be described with reference to FIGS. 6 and 7 of the accompanying drawings. The drive assembly 100 according to the second embodiment provides generally the same advantages and improvements in efficiency as the first embodiment described above.

The drive assembly 100 includes a shaft 154 having a hub 150 secured on one end for mounting a wheel assembly, and a wheel gear 164 keyed on another end of the shaft 154 within a housing 156. The wheel gear 164 is preferably a spur gear. The shaft 154 is supported within the housing 156 by first and second bearing assemblies 158, such as plain bronze bearings, roller bearings, or the like. The housing 156 includes a removable side plate 159 secured in place by suitable fastening bolts 157. A seal 160 is provided between the shaft 154 and the housing 156 to keep lubricating fluid within the housing 156 and to prevent dust and debris from entering the housing 156. The housing 156 is secured to the frame member 26 of the support assembly 10 by suitable fastening bolts 27 or the like to enable torque to be transmitted through the housing 156 to the wheels 42, 44. The housing 156 includes a fill plug 156*f* on a top surface and a drain plug 156*d* on a bottom surface.

A reduction gear assembly 166 is mounted for rotation within the housing 156 adjacent to the wheel gear 164. The reduction gear assembly 166 is supported at each end by a suitable bearing 168, such as a plain bronze bearing, roller bearing, or the like. The reduction gear assembly 166 has a first gear 170 having a relatively large diameter, and a second gear 172 having a relatively small diameter. The second gear 172 is intermeshed with the gear teeth on the wheel gear 164 so as to rotate therewith. The first and second gears 170, 172 are preferably spur gears and provide a gear reduction ratio with the wheel gear 164 of approximately 6:1 to 10:1, and preferably 9:1.

A worm pinion 174 is secured to a shaft 175 within the housing 156. The shaft 175 is coupled to an end of the drive shaft 76, as in the first embodiment described above. The shaft 175 is supported within the housing 156 by suitable bearing assemblies 177, such as plain bronze bearings, roller bearings, or the like. One of the bearings 177 preferably includes a removable bushing 178 to facilitate assembly and disassembly of the worm pinion 174 from the housing 156. A seal 180, 182 is provided between the housing 156 and each end of the shaft 175 to keep lubricating fluid within the housing 156 and to prevent dust and debris from entering the housing 156. The worm pinion 174 is intermeshed with the gear teeth on the first gear 170 of the reduction gear assembly 166 so as to rotatingly drive the first gear 170 upon rotation of the worm pinion 174. The gear reduction ratio between the worm pinion 174 and the first gear 170 of the spur gear reduction assembly 166 is large enough that the worm pinion 174 will prevent coasting of the wheels 42, 44 when the irrigation system traverses uneven terrain. For example, the gear reduction ratio between the worm pinion 174 and the first gear 170 of the reducing gear assembly 166 is at least 35:1, and preferably within the range of 40:1 to 60:1. In a preferred embodiment, a gear reduction ratio of 50:1 is provided between the worm pinion 174 and the first gear 170.

The drive assembly 100 according to the second embodiment differs from the drive assembly according to the first embodiment in that the worm pinion 174 is located below the first gear 170 of the spur gear reduction assembly 166. As shown in FIG. 6, the shaft 175 on which the worm pinion 174 is mounted enters the housing 156 of the drive assembly at an elevation between the axes of the spur gear reduction assembly 166 and the wheel gear 164. With this arrangement, the worm pinion 174 is located below the lubricant level in the housing 156 so as to be totally submerged in lubricant during operation. This improves the efficiency of the drive assembly 100 by reducing the friction loss between the worm pinion 174 and the spur gear reduction assembly 166. This arrangement also reduces the height of the housing 156, thereby making the whole assembly more compact.

It will be appreciated that the present invention is not limited to the exact constructions that have been described above and illustrated in the accompanying drawings, and that various modifications and changes can be made without departing from the scope and spirit of the invention. For example, a wheel gear having inwardly facing gear teeth intermeshed with corresponding gear teeth of the reduction gear assembly can be provided, rather than a wheel gear having gear teeth facing outwardly as shown in the drawings. It is intended that the scope of the invention only be limited by the appended claims.

What is claimed is:

1. An irrigation system having an improved wheel drive arrangement, comprising:
   an elongated pipe having a first end connected to a water supply, said pipe having a plurality of water discharge openings spaced along a length thereof for discharging water over an area to be irrigated;
   at least one support tower for supporting said pipe above the area to be irrigated, said support tower being supported by a plurality of wheels for movement in a direction transverse to a longitudinal direction of the pipe; and
   a drive motor and a driving connection between the drive motor and each of the wheels of the support tower, said driving connection comprising a worm pinion connected to a shaft driven by said drive motor, said worm pinion being intermeshed with a first spur gear of a reduction gear assembly, said reduction gear assembly having a second spur gear intermeshed with a wheel gear connected to the wheel of the support tower for rotation therewith, whereby rotation of the wheel gear by the reduction gear assembly will drivingly rotate the wheel.

2. The irrigation system according to claim 1, wherein said first gear of the reduction gear assembly is larger in diameter than said second gear of the reduction gear assembly.

3. The irrigation system according to claim 1, wherein said wheel gear is a spur gear.

4. The irrigation system according to claim 1, wherein said wheels of the support tower are each secured to a hub, said hub being secured to a spindle, and said wheel gear being secured to said spindle for rotation with said hub.

5. An irrigation system having an improved wheel drive arrangement, comprising:
   an elongated pipe having a first end connected to a water supply, said pipe having a plurality of water discharge openings spaced along a length thereof for discharging water over an area to be irrigated;
   at least one support tower for supporting said pipe above the area to be irrigated, said support tower being supported by a plurality of wheels for movement in a direction transverse to a longitudinal direction of the pipe; and
   a drive motor and a driving connection between the drive motor and each of the wheels of the support tower, said driving connection comprising a worm pinion connected to a shaft driven by said drive motor, said worm pinion being intermeshed with a first gear of a reduction gear assembly, said reduction gear assembly having a second gear intermeshed with a wheel gear connected to the wheel of the support tower for rotation therewith, whereby rotation of the wheel gear by the reduction gear assembly will drivingly rotate the wheel;
   wherein said worm pinion operates together with said first gear of the reduction gear assembly to provide a gear reduction ratio greater than 35:1 so as to prevent coasting of the wheels when traversing uneven terrain.

6. The irrigation system according to claim 5, wherein said worm pinion and said first gear of the reduction gear assembly provide a gear reduction ratio within the range of approximately 40:1 to 60:1.

7. The irrigation system according to claim 5, wherein said second gear of the reduction gear assembly and said wheel gear provide a gear reduction ratio within the range of approximately 6:1 to 10:1.

8. The irrigation system according to claim 5, wherein said second gear of the reduction gear assembly and said wheel gear provide a gear reduction ratio of approximately 9:1.

9. The irrigation system according to claim 1, wherein said first end of said elongated pipe is connected to a pivot structure having a generally vertical pivot axis, said support tower being arranged to move said elongated pipe in a circular pattern about said vertical axis of said pivot structure.

10. The irrigation system according to claim 1, wherein said support tower is supported by a front wheel and a rear wheel, said drive motor is positioned between said front and rear wheels, and an elongated drive shaft extends between a gearbox connected to said drive motor and each of said front and rear wheels, said worm pinion for each wheel being drivingly connected to respective ends of said drive shaft.

11. The irrigation system according to claim 10, wherein said worm pinion is detachably connected to the drive shaft, and the worm pinion, the reduction gear assembly, and the wheel gear are disposed in a housing, said housing being connected to the support tower to prevent rotation of the housing and enable torque to be exerted on the wheel gear and wheel connected therewith for driving the wheel.

12. The irrigation system according to claim 1, wherein said wheel gear comprises a spur gear having an outer periphery defined by a plurality of gear teeth extending outwardly therefrom, said gear teeth of said wheel gear being intermeshed with corresponding gear teeth of said reduction gear assembly.

13. The irrigation system according to claim 1, wherein said worm pinion, said reduction gear assembly, and said wheel gear are all mounted for rotation within a housing adjacent to a respective one of said wheels.

14. The irrigation system according to claim 13, wherein an axis of rotation of said worm pinion is between an axis of rotation of said wheel gear and an axis of rotation of said reduction gear assembly.

15. A center pivot irrigation system having an improved worm gear wheel drive assembly, comprising:

an elongated pipe movable over a relatively large land area to be irrigated, said elongated pipe having one end connected to a source of water and having a plurality of outlets for discharging water over the land area to be irrigated;

a plurality of support assemblies for supporting the elongated pipe, each support assembly including an elongated frame member generally in perpendicular relation to the elongated pipe, a wheel supported at each end of the elongated frame member for engaging the ground surface, at least one drive motor supported from the frame member, and a driving connection between said at least one drive motor and each of said wheels for driving the wheels and propelling the support assembly and the elongated pipe over the land area to be irrigated;

said driving connection comprising a worm pinion, a spur gear reducing assembly, and a wheel gear, said spur gear reducing assembly having an input side spur gear meshed with said worm pinion and an output side spur gear meshed with said wheel gear, said input side spur gear being larger than said output side spur gear, whereby the worm pinion, spur gear reducing assembly, and wheel gear provide a positive driving connection between said at least one drive motor and said wheels that prevents free wheeling of the wheels when traversing uneven terrain.

16. A center pivot irrigation system having an improved worm gear wheel drive assembly, comprising:

an elongated pipe having one end connected to a source of water and having a plurality of outlets for discharging water;

at least one support assembly for supporting the elongated pipe over an area to be irrigated, each support assembly including at least one drive wheel for propelling the support assembly and a final gear drive assembly associated with said drive wheel;

a drive motor and center drive assembly for drivingly connecting an output of said drive motor to an input of said final gear drive assembly;

said final gear drive assembly comprising an input shaft having a worm pinion mounted for rotation therewith, a wheel gear connected to said drive wheel for rotation therewith, and a reduction gear means having first and second spur gears interconnecting said worm pinion and said wheel gear for providing a gear reduction between said worm pinion and said wheel gear.

* * * * *

UNITED STATES PATENT AND TRADEMARK OFFICE
CERTIFICATE OF CORRECTION

PATENT NO. : 5,862,997
DATED : January 26, 1999
INVENTOR(S) : Richard F. Reinke

It is certified that error appears in the above-identified patent and that said Letters Patent is hereby corrected as shown below:

On the title page, item[56]: References Cited

Insert the following -   U.S. PATENT DOCUMENTS

| | | | |
|---|---|---|---|
| 3,583,639 | 6/1971  | Cornelius     | 239/212 |
| 3,623,662 | 11/1971 | Reinke        | 239/177 |
| 3,662,776 | 5/1972  | Bryant et al. | 239/728 |
| 3,690,343 | 9/1972  | Crane         | 137/344 |
| 3,730,435 | 5/1973  | Zimmerer et al. | 239/213 |
| 3,771,719 | 11/1973 | Raso et al.   | 239/177 |
| 3,831,692 | 8/1974  | Fry           | 180/14R |
| 3,944,007 | 3/1976  | Thom et al.   | 180/14R |
| 3,954,120 | 5/1976  | Zimmerer et al. | 137/344 |
| 4,093,036 | 6/1978  | Knutson       | 180/70R |

UNITED STATES PATENT AND TRADEMARK OFFICE
CERTIFICATE OF CORRECTION

PATENT NO. : 5,862,997
DATED : January 26, 1999
INVENTOR(S) : Richard F. Reinke

It is certified that error appears in the above-identified patent and that said Letters Patent is hereby corrected as shown below:

OTHER PUBLICATIONS

Reinke Irrigation Systems Product Catalog, 1997, pages 8-9.
Valmont Industries Brochure for "Valley Gearboxes," No. AD10180 BP8/93.
Valley Product Catalog, 1996, pages 9 and 10.
Lindsay Manuafacturing Co. Catalog, pages 10 and 11.
Lindsay Manufacturing Co. Brochure for "Zimmatic Drive Train."
Nebraska Irrigation, Inc. Brochure for "NI Drive Train Kits & Components," 1994.

Signed and Sealed this

Thirteenth Day of July, 1999

*Attest:*

Q. TODD DICKINSON

*Attesting Officer*   Acting Commissioner of Patents and Trademarks